United States Patent
Thangadurai et al.

(10) Patent No.: US 8,489,714 B2
(45) Date of Patent: *Jul. 16, 2013

(54) WAIT FOR READY STATE

(75) Inventors: Shiva Shankar Thangadurai, Hyderabad (IN); S Neeraja Reddy, Hyderabad (IN); Moshe Vainer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 29 days.

This patent is subject to a terminal disclaimer.

(21) Appl. No.: 13/022,054

(22) Filed: Feb. 7, 2011

(65) Prior Publication Data
US 2011/0145402 A1   Jun. 16, 2011

Related U.S. Application Data

(63) Continuation of application No. 12/055,325, filed on Mar. 26, 2008, now Pat. No. 7,912,927.

(51) Int. Cl.
*G06F 15/173* (2006.01)
(52) U.S. Cl.
USPC ............................. 709/220; 709/227; 709/229
(58) Field of Classification Search
USPC ........................... 709/220, 227, 229; 370/242
See application file for complete search history.

(56) References Cited

U.S. PATENT DOCUMENTS

| 5,781,720 | A | 7/1998 | Parker et al. |
|---|---|---|---|
| 5,802,334 | A | 9/1998 | Nickolas et al. |
| 6,078,327 | A | 6/2000 | Liman et al. |
| 6,266,681 | B1 | 7/2001 | Guthrie |
| 6,408,403 | B1 | 6/2002 | Rodrigues et al. |
| 6,424,361 | B1 | 7/2002 | Chapuis |
| 6,496,208 | B1 | 12/2002 | Bernhardt et al. |
| 6,772,165 | B2 | 8/2004 | O'Carroll |
| 6,826,443 | B2 | 11/2004 | Makinen |
| 6,857,124 | B1 | 2/2005 | Doyle |
| 6,868,414 | B2 | 3/2005 | Khanna et al. |
| 6,914,914 | B1 * | 7/2005 | Flood et al. ............... 370/503 |
| 6,961,909 | B2 | 11/2005 | Lord et al. |
| 7,117,216 | B2 | 10/2006 | Chakraborty et al. |
| 7,231,606 | B2 | 6/2007 | Miller et al. |
| 7,243,090 | B2 | 7/2007 | Kinzhalin et al. |
| 7,343,568 | B2 | 3/2008 | Jiang et al. |
| 7,426,703 | B2 | 9/2008 | Cheung et al. |
| 7,475,365 | B2 | 1/2009 | Nan et al. |
| 7,580,970 | B2 | 8/2009 | Bank et al. |

(Continued)

OTHER PUBLICATIONS

Amendment after Notice of Allowance cited in U.S. Appl. No. 12/055,325 dated Jan. 21, 2011, 11 pgs.

(Continued)

*Primary Examiner* — Khanh Dinh
(74) *Attorney, Agent, or Firm* — Microsoft Corporation

(57) ABSTRACT

Automation of actions on a server system (e.g., web server, FTP server) is facilitated by a server system that is ready for actions to be performed upon it. Because there are scenarios when a server system is not in a state to be acted upon (e.g., web page changed due to navigation, script execution, asynchronous request through dynamic web extensions), an automated action needs to be synchronized to when then server system is in a ready state for that action to occur. A wait-for-ready state can be initiated that detects when a server system is ready for a next action.

20 Claims, 7 Drawing Sheets

U.S. PATENT DOCUMENTS

| | | | |
|---|---|---|---|
| 7,639,951 B2 | 12/2009 | Hirayama | |
| 7,653,721 B1 | 1/2010 | Romanov et al. | |
| 7,669,147 B1 | 2/2010 | Molander et al. | |
| 7,698,392 B2* | 4/2010 | Zapata et al. | 709/220 |
| 7,788,476 B2* | 8/2010 | McNutt et al. | 713/1 |
| 7,792,043 B2* | 9/2010 | McNutt et al. | 370/242 |
| 8,321,653 B2* | 11/2012 | McNutt et al. | 713/1 |
| 8,361,166 B2* | 1/2013 | Bhansali et al. | 726/35 |
| 2002/0083188 A1 | 6/2002 | Hericy et al. | |
| 2002/0161604 A1* | 10/2002 | Kardos et al. | 705/1 |
| 2002/0172224 A1* | 11/2002 | Matteson et al. | 370/502 |
| 2002/0188613 A1 | 12/2002 | Chakraborty et al. | |
| 2003/0043192 A1 | 3/2003 | Bouleau | |
| 2004/0098707 A1 | 5/2004 | Tang et al. | |
| 2004/0225965 A1 | 11/2004 | Garside et al. | |
| 2005/0022115 A1 | 1/2005 | Baumgartner et al. | |
| 2005/0246153 A1 | 11/2005 | Genkin et al. | |
| 2005/0278728 A1 | 12/2005 | Klementiev | |
| 2006/0064481 A1 | 3/2006 | Baron et al. | |
| 2006/0064486 A1 | 3/2006 | Baron et al. | |
| 2006/0095895 A1 | 5/2006 | Sudheer | |
| 2006/0101392 A1 | 5/2006 | Isaza | |
| 2006/0184410 A1 | 8/2006 | Ramamurthy et al. | |
| 2006/0222160 A1 | 10/2006 | Bank et al. | |
| 2006/0253904 A1* | 11/2006 | Bhansali et al. | 726/13 |
| 2006/0276997 A1 | 12/2006 | Drees | |
| 2007/0011650 A1 | 1/2007 | Hage et al. | |
| 2007/0061625 A1 | 3/2007 | Acosta, Jr. et al. | |
| 2007/0074169 A1 | 3/2007 | Chess et al. | |
| 2007/0088668 A1 | 4/2007 | Larab et al. | |
| 2007/0130293 A1 | 6/2007 | Dong et al. | |
| 2007/0150556 A1 | 6/2007 | Fukuda et al. | |
| 2007/0174300 A1 | 7/2007 | Kim | |
| 2007/0174419 A1 | 7/2007 | O'Connell et al. | |
| 2007/0192181 A1 | 8/2007 | Asdourian | |
| 2007/0214239 A1 | 9/2007 | Mechkov et al. | |
| 2007/0240118 A1 | 10/2007 | Keren | |
| 2007/0294619 A1 | 12/2007 | Krishnaswamy et al. | |
| 2008/0010537 A1 | 1/2008 | Hayutin et al. | |
| 2008/0092057 A1 | 4/2008 | Monson et al. | |
| 2008/0134284 A1* | 6/2008 | Bhansali et al. | 726/1 |
| 2008/0310816 A1 | 12/2008 | Allen et al. | |
| 2009/0089404 A1 | 4/2009 | Guo | |
| 2009/0249300 A1 | 10/2009 | Vainer et al. | |
| 2010/0088651 A1 | 4/2010 | Srivastava et al. | |
| 2010/0125651 A1 | 5/2010 | Zapata et al. | |
| 2010/0251217 A1 | 9/2010 | Miller | |
| 2011/0145402 A1 | 6/2011 | Thangadurai et al. | |

OTHER PUBLICATIONS

Non-Final Office Action cited in U.S. Appl. No. 12/056,301 dated Jul. 27, 2011, 31 pgs.

Reply Non-Final Office Action cited in U.S. Appl. No. 12/056,301 dated Oct. 27, 2011, 12 pgs.

Notice of Allowance cited in U.S. Appl. No. 12/056,301 dated Dec. 19, 2011, 33 pgs.

Amendment after Notice of Allowance cited in U.S. Appl. No. 12/056,301 dated Mar. 13, 2012, 11 pgs.

Non-Final Office Action cited in U.S. Appl. No. 12/247,022 dated Mar. 16, 2012, 17 pgs.

Reply Non-Final Office Action cited in U.S. Appl. No. 12/247,022 dated Jul. 13, 2012, 16 pgs.

"Composing a Framework to Automate Testing of Operational Web-Based Software", Sreedevi Sampath, Valentin Mihaylov, Amie Souter and Lori Pollock, Proceedings of the 20thIEEE International Conference on Software Maintenance, 2004, 10 pgs.

Notice of Allowance cited in U.S. Appl. No. 12/055,325 dated Oct. 21, 2010, 43 pgs.

Supplemental Notice of Allowance cited in U.S. Appl. No. 12/055,325 dated Oct. 29, 2011, 15 pgs.

"How to Handle Ajax Responses", Kyle Hadlock, Feb. 10, 2006, reprinted from the Internet at: http://www.peachpit.com/articles/article.aspx?p=443580, 2 pgs.

"Mastering Ajax, Part 3: Advanced requests and responses in Ajax", Brett McLAUGHLIN, Feb. 14, 2006, reprinted from the Internet at: http://www.ibm.com/developerworks/library/wa-ajaxintro3/, 14 pgs.

"AJAX testing using QEngine", Reghavan, Oct. 15, 2007, reprinted from the Internet at: http://blogs,qengine.com/2007/10/14/ajax-testing-using-qengine, 4 pgs.

"AJAX Test Automation", Dr James McCAFFREY, Feb. 2007, reprinted from the Internet at: http://msdn.microsoft.com/en-us/magazine/cc163479.aspx. 10 pgs.

"Testing Ajax Applications with Selenium", Jeff Xiong,Mike Williams and Josh Price, Sep. 25, 2006, reprinted from the Internet at: http://www.infoq.com/articles/testing-ajax-selenium, 5 pgs.

"Inventions on Tree Navigators used in Graphical User Interface", Umakant Mishra, Dec. 6, 2005, reprinted from the Internet at: http://papers.ssrn.com/sol3/papers.cfm?abstract id=949244, 7 pgs.

"Advancing Toward Test Automation through Effective Manual Testing", Bob Levy, May 2005, reprinted from the Internet at: ftp://ftp.software.ibm.com/software/rational/web/whitepapers/mt_ft_wp.pdf, 12 pgs.

"UI Automation and Microsoft Active Accessibility", May 7, 2008, reprinted from the Internet at: http://msdn.microsoft.com/en-us/library/ms788733.aspx, 1 pgs.

"User Interface Automation (UIA)—Working Draft", Oct. 10, 2008, reprinted from the Internet at: http://download.microsoft.com/download/5/e/1/5e168397-91dd-4ca3-ac7e-2131aec8cd1b/Overview_uia.doc, 38 pgs.

"How to use UI Automation Verify (UIA Verify)", Microsoft Corporation, Mar. 2008, reprinted from the Internet at: http://www.google.com.In/url?sa=t&ct=res&cd=7&url=http°43M/02F%2Fwww.codeplex.com%2FProject%2FDownload°/02FFileDownload.aspx%3FProjectName%3DUIAutomationVerify°/026DownloadID%3D29576&ei=WmQhSPrB4v2wwGXzdnPAw&usg=AFQjCNESrz0Yw31RaEohOYFhPCELD14w&sig2=FQz0MkaE7cgKEU2cKNq1X, 20 pgs.

* cited by examiner

WAIT FOR READY STATE

RELATED APPLICATION

This application is a continuation of U.S. patent application Ser. No. 12/055,325, filed on Mar. 26, 2008, entitled "WAIT FOR READY STATE", incorporated by reference herein.

BACKGROUND

In computing environments, one may wish to automate actions on a server system (e.g., a web server, or FTP server) for a variety of reasons (e.g., for testing, debugging, efficient use of resources). In a web page environment, for example, a user may wish to record their actions for later automated playback (e.g., for use as a single-button control). In this example, it would be desirable that playback account for all actions and system states that occurred while the user was recording. However, some actions and system states that occur "behind-the-scenes" may not be properly recorded; therefore the automation playback may fail or produce improper results.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In a computing environment, if one wishes to create an automation of actions and system states on a server system it must account for all actions and system states, otherwise the automation may fail or produce erroneous results. Often, there are actions (e.g., loading a web page) and system states (e.g., state of a client-side web browser) occurring "behind-the-scenes" when an overt action is initiated on a server system. For example, when one selects (e.g., an action that clicks on) a hyperlink on a first webpage a server system must retrieve and then load a corresponding web page. However, if a user then selects a hyperlink on a newly loaded, second web page, which navigates to another web page, an automation process would need to know that the first web page had loaded (e.g., a system state) before selecting the hyperlink on the second webpage. If the automation attempted to select the hyperlink on the second web page before it had completely loaded the automation may fail; or, if another incorrect hyperlink was present that was within the selection criteria of the automation, the incorrect hyperlink may be selected. Additionally, for example, there are web applications that utilize update panels on web pages, which can be updated without updating the entire page. Therefore, if a recorded action included updating one of these update panels and selecting an item in a newly updated panel, an automation process may not wait for the update (e.g., a system state) and may thus (undesirably) select an item in the panel before it had been updated.

As provided herein, one or more techniques and/or systems for performing automated recorded actions on a server system, using request monitoring, are designed to monitor requests that are generated when an action is initiated on a server system, and maintain a "wait-for-ready" state until all request have been completed; thereby synchronizing a next recorded action with a server system state that is ready to perform that action. For example, this technique may monitor request objects generated by a dynamic web application (e.g., AJAX objects), and determine when they are complete so that when a next action is performed, the system is ready. It is to be appreciated that the terms record or recorded as used herein are not meant to be narrowly construed. That is, the actions need not be strictly limited to recorded actions per se. For example, such actions may also generally comprise user interface actions that may not necessarily be recorded.

To facilitate, at least some of, the same, a recorded action is initiated and a status of generated requests is monitored. Monitoring comprises applying a monitoring interface to generated request objects, such that a state change of the request objects can be tracked. Monitoring further comprises determining when the request objects' state is "completed," which indicates that a request from the action has been completed. Monitoring the status of requests continues until all of the requests are determined to be in a "completed" state, which indicates that an action on a server system has been "completed." Therefore, once the action is determined to be "complete," a next recorded action can be initiated with little concern that a system is not ready to be acted upon.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
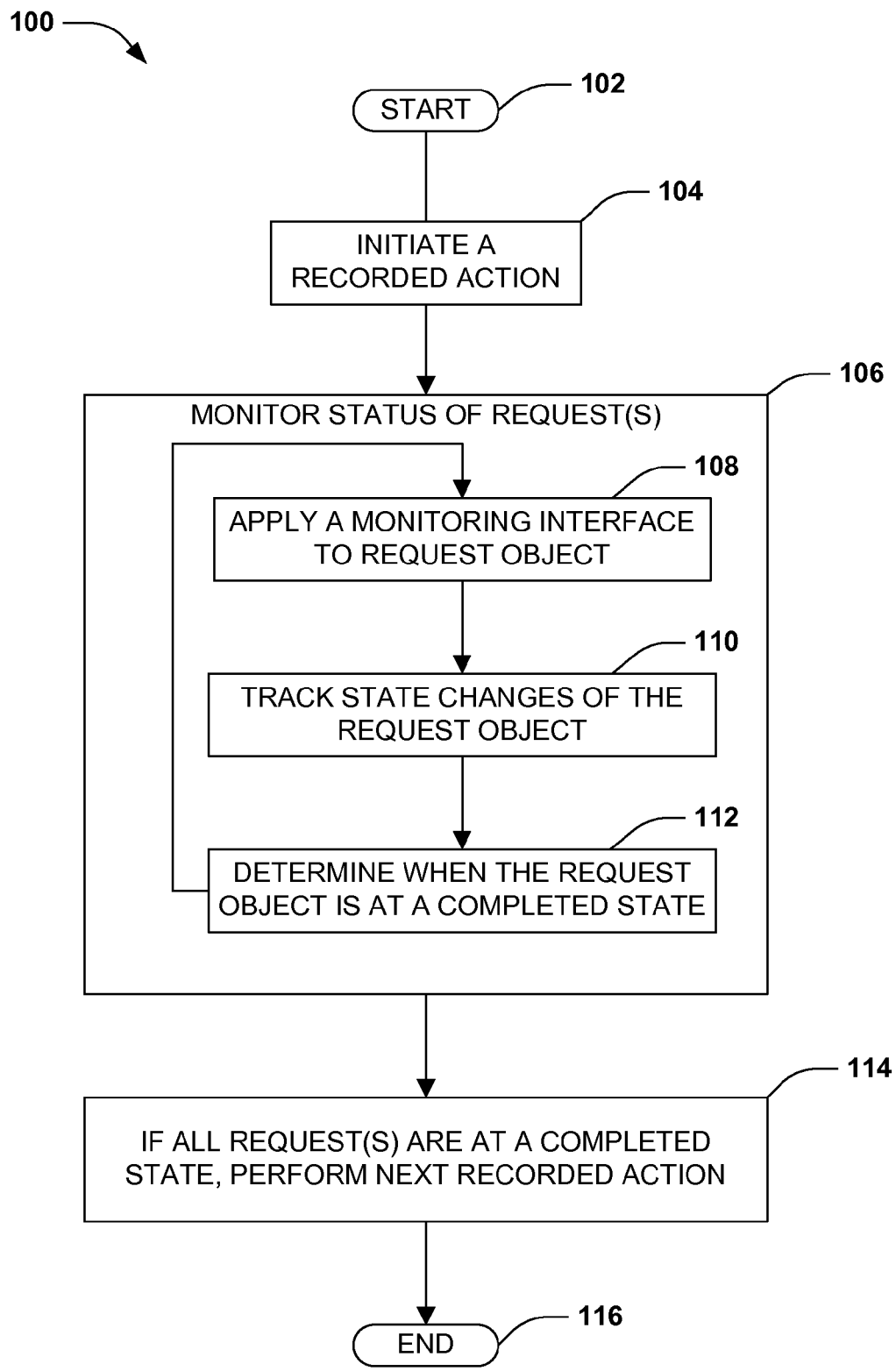
FIG. 1 is a flow diagram illustrating an exemplary method for performing recorded actions.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

In a computing environment, automation of recorded actions on server system (e.g., webpage server, or file transfer server) necessitates that an automation process account for states in which the server system may not be ready for a particular automated action. For example, there are times when a system may not be in a state to be queried upon. When a sequence of actions to be automated includes selecting (e.g., clicking on) hyperlinks on two separate web pages after a first hyperlink is selected, for example, if the automation process attempts to select the next hyperlink before the first webpage is loaded, the automation process may fail or an incorrect hyperlink may be selected.

Further, there are times when server system-based applications may not be in a state to be queried upon. For example, web pages running web-based applications can be changed when navigating to a new page, if there is a script execution that modifies content, for example, or if an asynchronous request occurs from an interactive web function (e.g., AJAX). As an example, automated actions may include: after navigating to a webpage, clicking on a table's sorting criteria in an ASP.Net AJAX update panel on the webpage, clicking on new sorting criteria after initial sort results are returned, and clicking on a result from newly returned results. Automation of the recorded actions may need to account for time it may take to load the table in the ASP.Net AJAX update panel, and time to return sorting results from each of the two sort selections. In this example, if the automation process attempted to select a sorting criteria before the webpage had loaded the table or the ASP.Net AJAX update panel, the attempted sort selection may fail. Further, if the automation process attempts to select a sort criteria before results from the first sort selection are returned, the process may yield incorrect results, and the last part of the automation process, the selecting of a result, would likely return incorrect information.

Failures of an automation process of recorded actions on a system may be characterized as synchronization problems. For example, a failure may result from a server or client state not being synchronized to timing an occurrence of a recorded action. One technique for automating actions on a system, for example, may include determining whether the system being automated is in an appropriate state to be acted upon by the recorded action. This may include implementing a wait-for-ready state for each recorded action, which waits until the system is in an appropriate state to be acted upon before proceeding with the recorded action. For example, the wait-for-ready state may determine that no web page navigations are occurring, or that no downloads are in progress from a server system, by tracking web browser events. Further, the wait-for-ready state may determine that an HTML document is in a completed state by tracking web browser events and DOM document events. However, while a web browser or DOM document control may raise an event that can be tracked, there are times when no such events are raised for actions upon a server system, for example, when web applications allow for panels on a webpage to be dynamically updated without having to update the entire web page.

An alternate technique, as provided herein, for automatically performing recorded actions on a server system using request monitoring (e.g., wait-for-ready) is illustrated in exemplary method 100 of FIG. 1. The exemplary method 100 starts at 102 and involves initiating a recorded action at 104. Once an action is initiated, a status of request(s) (e.g., one or more) generated by the action is monitored at 106. Monitoring request(s) involves applying a monitoring interface to a request object at 108, tracking state changes of the request object at 110, and determining when the request object is at a "completed" state at 112. A monitoring cycle of 108→110→112 at 106 is undertaken for each request object generated by each request (e.g., one or more). Once the request object(s) have been determined to be in a completed state, for all request(s) (e.g., one or more) at 106, the exemplary method performs a next recorded action at 114. After performing a next recorded action, the exemplary method ends at 116.

Figure 2:
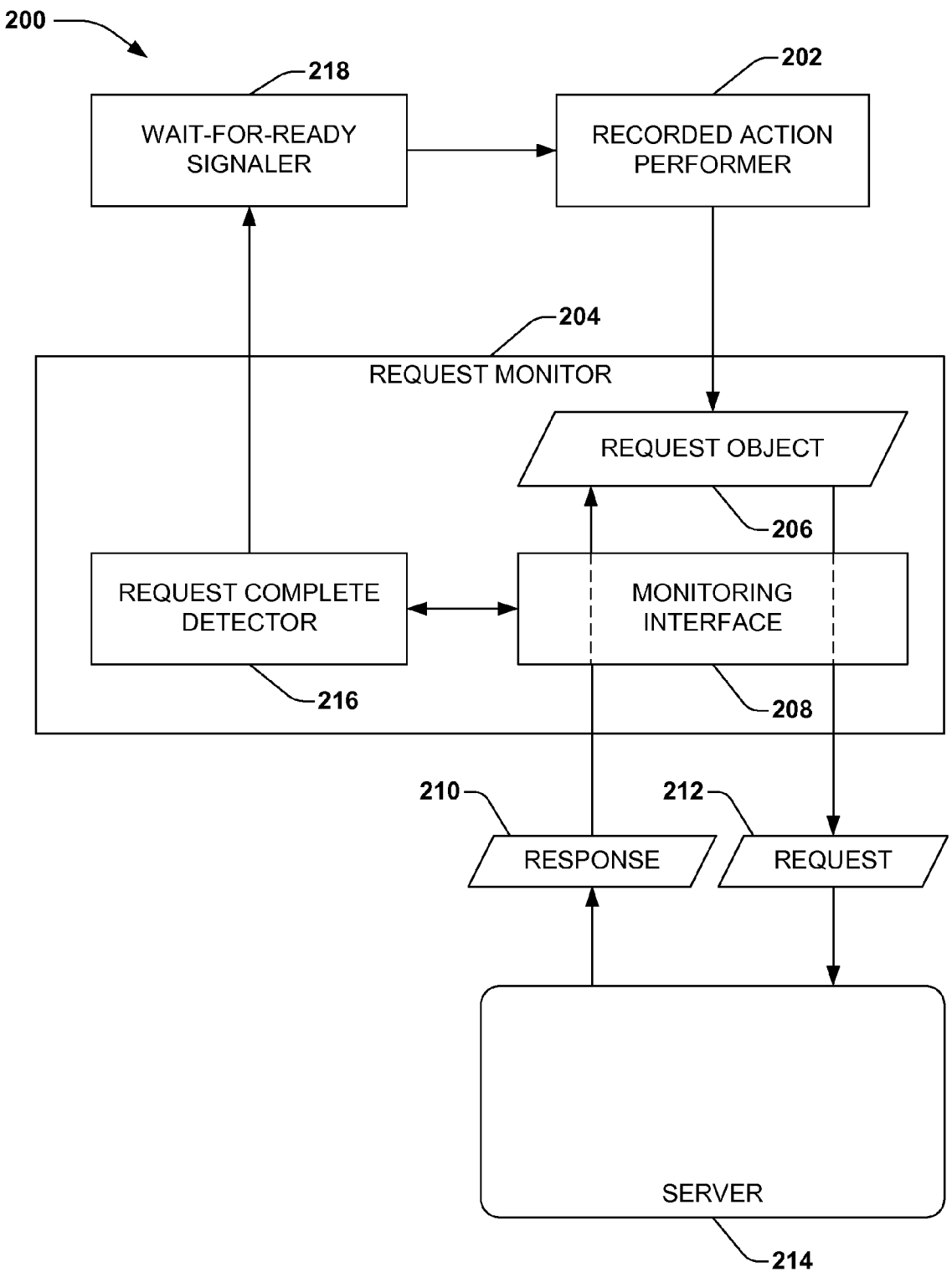
FIG. 2 is an illustration of an exemplary system for performing recorded actions.

FIG. 2 illustrates an exemplary system 200 configured to automatically perform recorded actions on a server system using a request monitor (e.g., wait-for-ready). A recorded action performer 202 initiates an action, which generates a request object 206. The request object 206 is sent to a request monitor 204, which is configured with a monitoring interface 208. Requests 212 sent to a server 214 and responses 210 to the requests 212 sent from the server 214 are routed through the monitoring interface 208 in the request monitor 204. The monitoring interface detects state changes for the request object 206 sent by the responses 210 from the server 214. The request complete detector 216 may determine that the monitoring interface 208 identified that the request object 206 is in a "completed" state, indicating that a request 212 has been completed on the server 214. The request complete detector 216 indicates to a wait-for-ready signaler 218 that the request has been completed. The wait-for-ready signaler 218 then sends a signal to the recorded action performer 202 that a next recorded action may be performed.

As an example of one embodiment of the technique described herein, if a user wished to determine whether a newly created email account is working, they may create an email message in that account, send the message to themselves, then select and delete the message once it arrives. This process may be recorded and automated for a web-based email system that uses AJAX based web applications on a webpage for its email system, for example. AJAX based web applications allow for panels on a webpage to be dynamically updated without having to update the entire web page. AJAX requests (e.g., made through an XMLHttpRequest object) do not raise web browser control events, so the AJAX requests cannot be tracked using those events. Therefore, a custom monitoring interface is used to detect state changes in the AJAX request objects. As request calls and response sendbacks are monitored, the state of the AJAX request can be determined by the monitoring interface. Once the state of the request object reaches "completed" (e.g., "loaded"), and the state of all the requests for an action are "completed" a next recorded action may safely occur.

In this example, if a send action is initiated by the email system, in order to process the select mail action (e.g., a next recorded action), the sent message needs to arrive in the inbox. Therefore, all requests associated with the send action (e.g., sending the message, receiving the message, displaying the message in the inbox) need to be "completed" before the select message action is initiated. Further, each AJAX request object (e.g., XMLHttpRequest object) needs to be "completed" for each request from the send message action. Additionally, in this example, if a request object times out (e.g., if a response is not received from a server system within a specified amount of time) the state of the AJAX request is set to completed (e.g., loaded). Also, if the send message action times out (e.g., all action requests not completed within a specified amount of time) the select message action (e.g., a next recorded action) is performed on the webpage.

Figure 3:
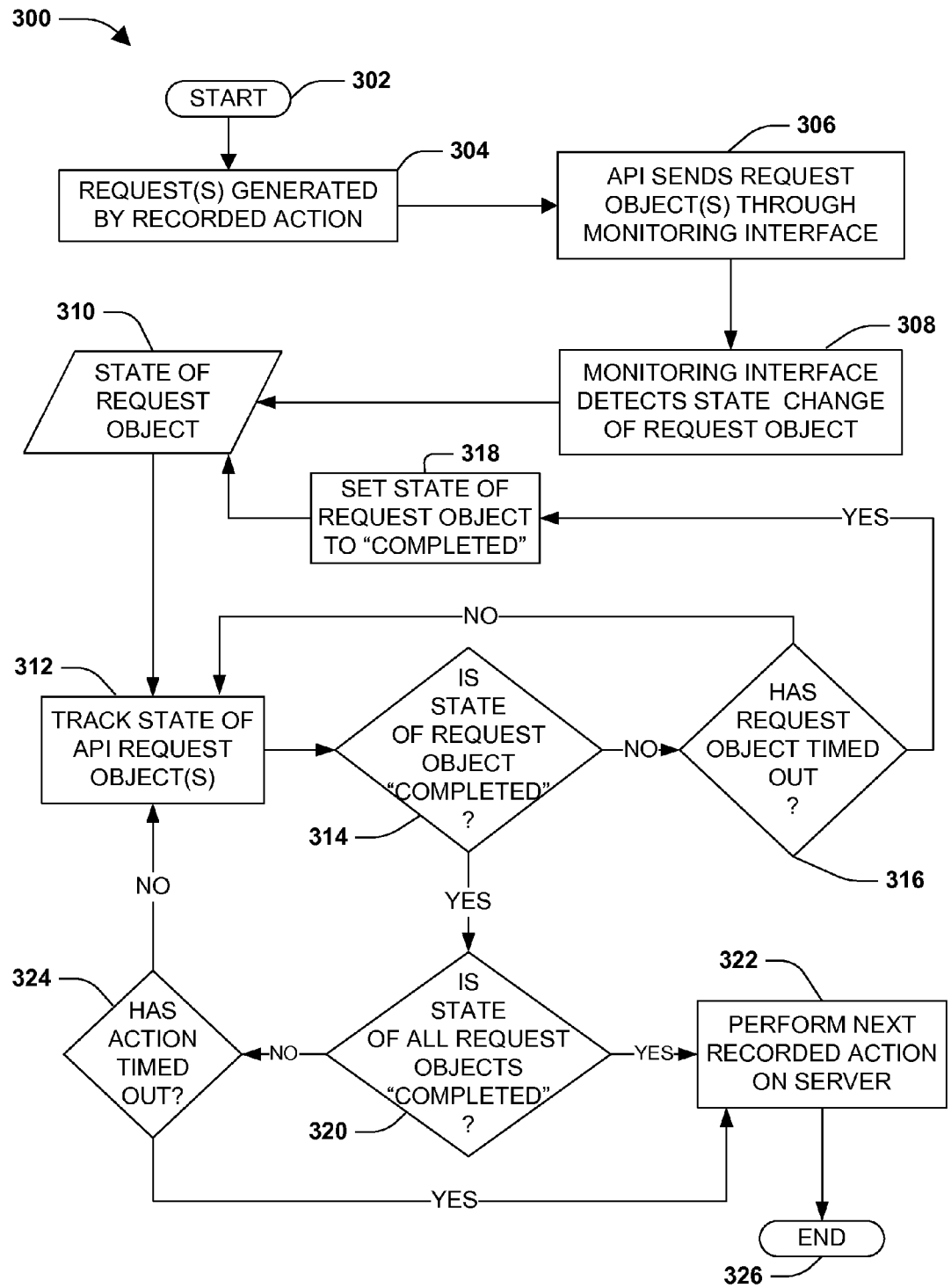
FIG. 3 is a flow diagram illustrating an exemplary method for performing recorded actions.

An example of one configuration of exemplary method 100 in FIG. 1 is illustrated in FIG. 3, by exemplary method 300. Exemplary method 300 begins at 302 and involves one or more requests being generated by a recorded action at 304. An application programming interface sends request objects, from the one or more requests, through a monitoring interface at 306. The monitoring interface detects whether a state change has occurred for a request object at 308. If the request object's state has changed, the state of the request object 310 is tracked at 312. At 314 the method determines whether the state of the request object is "completed." If the state of the request object is "completed" the exemplary method determines whether the state of all (e.g., one or more) request objects is "completed" at 320. If the state of all the request objects is "completed" the exemplary method performs a next recorded action on a server at 322. However, if the state of the request object is not "completed" at 314, the method determines whether the request object has timed out (e.g., not completed within a specified amount of time) at 316. If the request object has not timed out, the exemplary method continues to track the state of the request object at 312. On the other hand, if the request object has timed out at 316, the method sets the state of the request object to "completed" at 318. If the state of all request objects is not "completed" at 320, the exemplary method determines whether the action has timed out at 324. If the action has not timed out, the exemplary method continues to track the state of the request object(s) at 312. However, if the action has timed out at 324, the exemplary method performs a next recorded action on the server at 322. Having performed the next recorded action at 322, the exemplary method 300 ends at 326.

In one aspect, one can monitor requests of an action by monitoring when application programming interface (API) request objects (e.g., AJAX request objects) are generated, and when they are "completed". In this aspect, a custom object adapter pattern (e.g., object wrapper) can be generated and applied when an API request object is generated. By applying a custom object adapter pattern to the request object, all calls on the request object (e.g., open and send calls) will run through and be detected by the custom object adapter pattern. Further, state changes can be detected because the request object's properties (e.g., when onreadystatechange specifies a reference to an event handler at a state change) will also run through the custom object adapter pattern. Also, the request object's state (e.g., loaded) can be detected when a response is returned from a server system, through the custom object adapter pattern, to the request object. In this aspect, when an open and send call is detected for a request object, a monitoring counter may increment by one. Therefore, for each request object that is generated and sent, the monitoring counter may increment by one. As responses are received from the server system, and the request object's state is set to "completed" (e.g., loaded), the monitoring counter may decrement by one. Therefore, for each request object whose state is set to "completed," the monitoring counter may be decremented by one. As such, the monitoring counter may increase for each request and may decrease when each request is finished. Therefore, when the monitoring counter reaches zero, all requests for an action may have been completed and the server system may be ready for a next recorded action.

Figure 4:
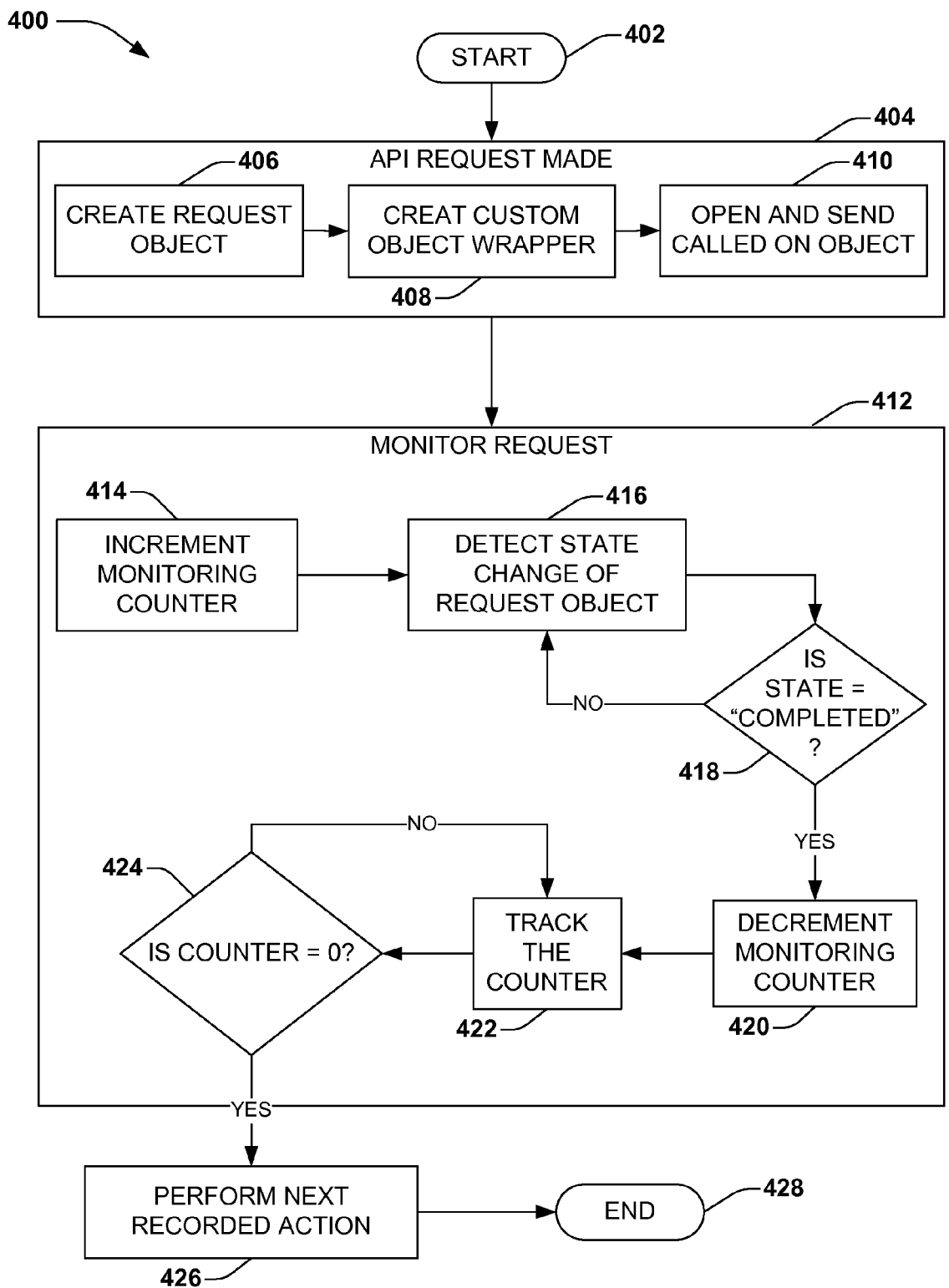
FIG. 4 is a flow diagram illustrating an exemplary method for performing recorded actions.

An example of one configuration for automatically performing recorded actions by monitoring requests using an incremental monitoring counter is illustrated in FIG. 4. The exemplary method 400 illustrated in FIG. 4 starts at 402, and an API request is made at 404. The API request involves creating a request object at 406, creating a custom object adapter pattern (e.g., object wrapper) at 408, and an open and send being called on the request object at 410. Once an open and send is called on the request object, as detected by the custom object adapter pattern, the exemplary method 400 begins monitoring the request object at 412. To monitor a request object, a monitoring counter is incremented at 414. At 416 the method detects state changes in the request object. If the state of the request object has not changed to "completed" at 418, the method continues to monitor state changes at 416. However, if the request object's state is "completed" at 418, the monitoring counter is decremented at 420. The monitoring counter is tracked at 422, and if the counter has not reached zero at 424, the method returns to 422 to continue monitoring the counter. Otherwise, if the counter has reached zero at 424, a next recorded action is performed at 426. Having performed the next recorded action, the method ends at 428.

Figure 5:
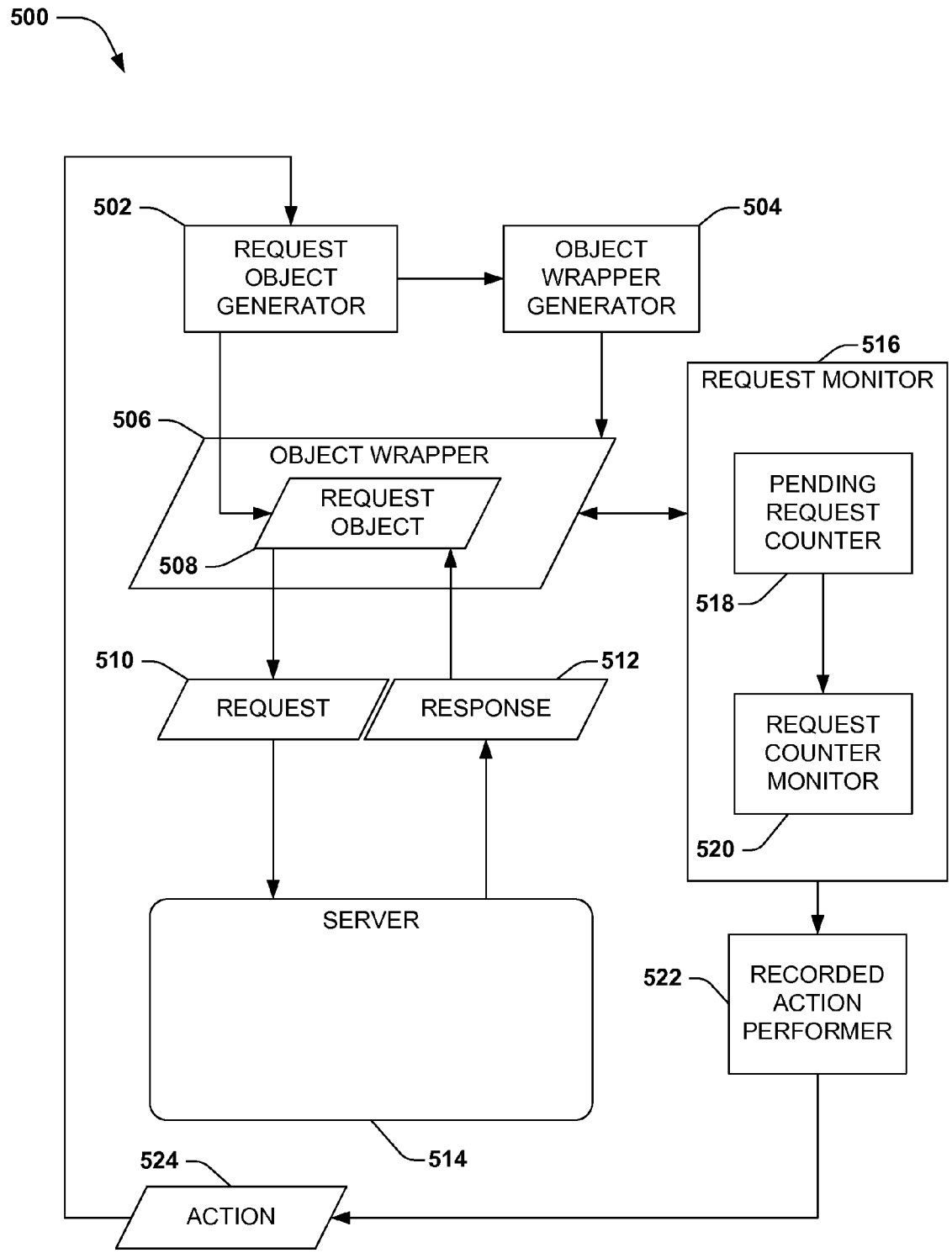
FIG. 5 is an illustration of an exemplary system for performing recorded actions.

FIG. 5 illustrates an exemplary system 500 for automatically performing recorded actions by monitoring requests to a server system using an incremental monitoring counter. A request object generator 502 generates a request object 508 when called by an action 524. An object wrapper generator 504 generates a custom wrapper 506 for the request object 508. Requests 510 to a server 514 are sent from the request object 508 through the object wrapper 506, and are detected by a request monitor 516. When a new request 510 is sent to the server 514 the request monitor 516 increments a pending request counter 518. When a response 512 is sent from the server 514 through the object wrapper 506 to the request object 508, the object wrapper detects whether the response 512 sets a state of the request object 508 to "completed." When the state of the request object 508 is "completed" the request monitor 516 decrements the pending request counter 518. The request monitor 516 has a request counter monitor 520 that monitors the pending request counter 518. When the request counter monitor 520 detects that the pending request counter 518 has reached zero, the request monitor 516 signals a recorded action performer component 522 that the server 514 is ready to perform a next recorded action 524.

Figure 6:
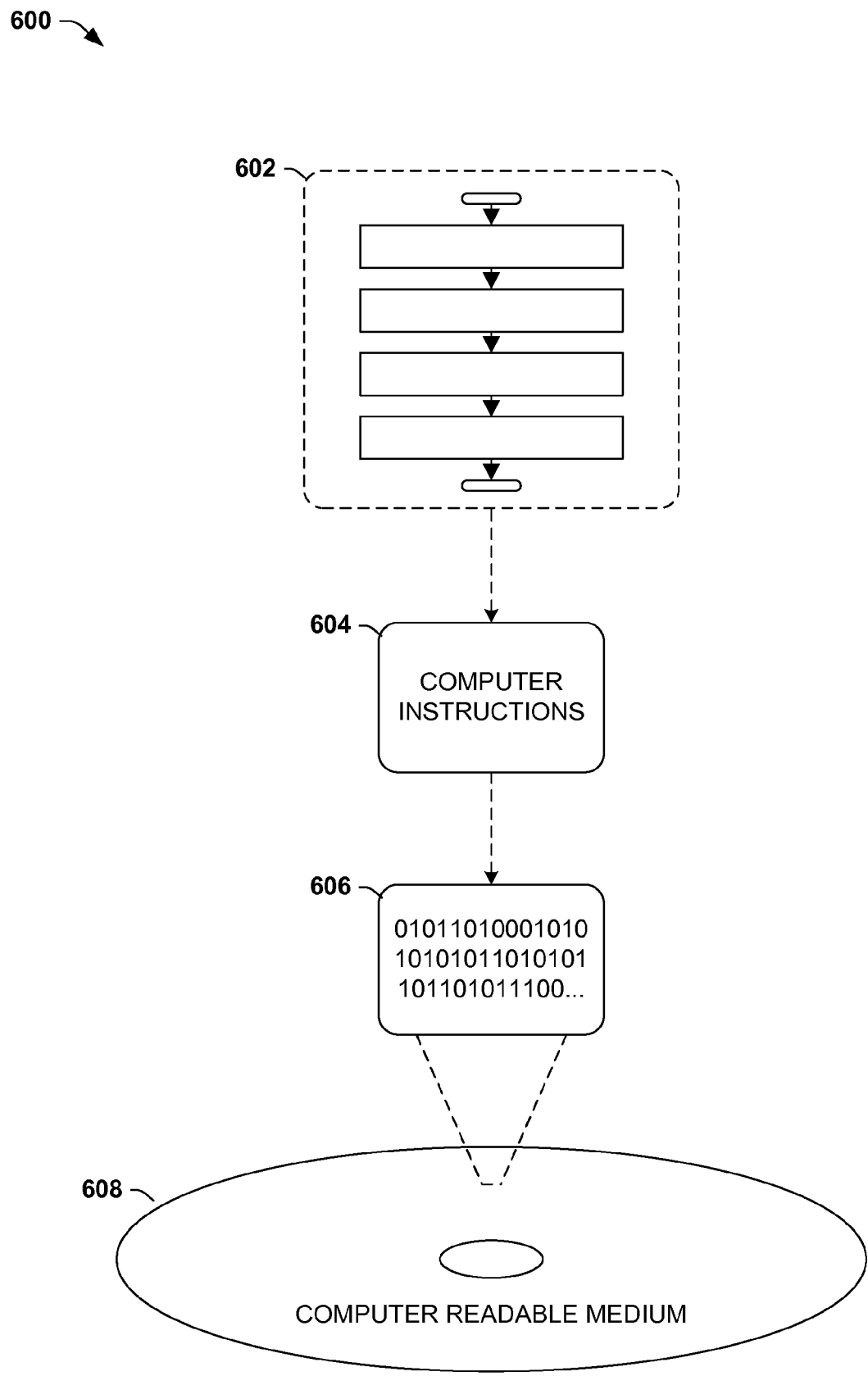
FIG. 6 is an illustration of an exemplary computer-readable medium comprising processor-executable instructions configured to embody one or more of the techniques provided herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 6, wherein the implementation 600 comprises a computer-readable medium 608 (e.g., a CD-R, DVD-R, or a platter of a hard disk drive), on which is encoded computer-readable data 606. This computer-readable data 606 in turn comprises a set of computer instructions 604 configured to operate according to the principles set forth herein. In one such embodiment, the processor-executable instructions 604 may be configured to perform a method 602 for automatically performing recorded actions on a server system using request monitoring (e.g., wait-for-ready), such as the method 100 of FIG. 1, for example. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
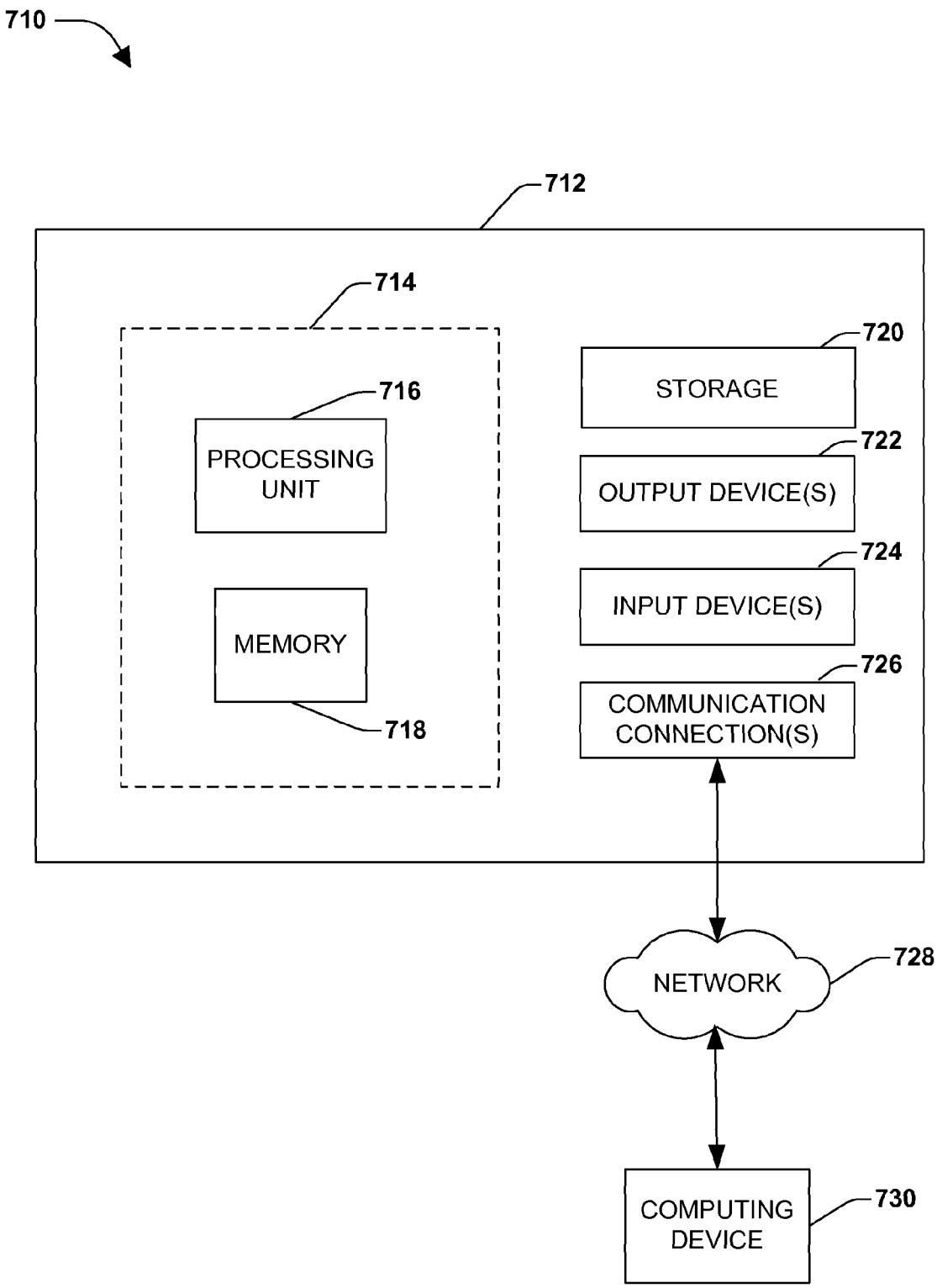
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 8394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for performing at least two recorded actions on a server system, comprising:
   initiating a recorded action;
   monitoring a status of one or more requests from the recorded action, comprising:
   applying a monitoring interface to one or more request objects associated with at least some of the one or more requests;
   tracking state changes of the one or more request objects using the monitoring interface; and
   determining when the one or more request objects are at a completed state based at least in part upon the tracking; and
   upon detecting a completed status for all of the one or more requests based upon the monitoring, performing a next recorded action on the server system.

2. The method of claim 1, the monitoring comprising:
   upon detecting that a predetermined amount of time has elapsed, setting a state of at least one of the one or more request objects to a completed state.

3. The method of claim 1, the monitoring comprising:
   upon detecting that a response to a first request object of the one or more request objects has not been generated by the server system within a predetermined amount of time, setting the state of the first request object to a completed state.

4. The method of claim 1, comprising:
   upon detecting that a predetermined amount of time has elapsed, performing the next recorded action.

5. The method of claim 1, comprising:
   upon detecting that a response to a request has not been generated by the server system within a predetermined amount of time, performing the next recorded action.

6. The method of claim 1, at least some of the one or more request objects comprising application programming interface request objects.

7. The method of claim 1, the monitoring interface comprising a detector for detecting, on the server system, at least one of the following: actions; wait states; requests; request object methods; request object properties; or responses.

8. The method of claim 1, the monitoring interface comprising an object adapter pattern.

9. The method of claim 1, the applying a monitoring interface comprising:
   upon detecting a request object, generating an adapter pattern for the request object.

10. The method of claim 1, the tracking state changes comprising using references to an event handler specified by an application programming interface property.

11. The method of claim 1, the monitoring a status of one or more requests comprising incrementing a monitoring counter when a request is initiated, and decrementing the monitoring counter when the status of the request is completed.

12. The method of claim 11, the detecting a completed status for all of the one or more requests comprising detecting when the monitoring counter reaches zero.

13. The method of claim 1, the performing a next recorded action comprising incrementally conducting a next action predetermined to occur by a record of actions.

14. The method of claim 1, the server system comprising a web server.

15. The method of claim 1, the server system comprising at least one of:
   Internet protocol; file transfer protocol; user datagram protocol; dynamic host configuration protocol; hypertext transfer protocol; Telnet remote protocol; secure shell remote protocol; post office protocol 3; simple mail transfer protocol; or Internet message access protocol.

16. A system configured to perform at least two recorded actions on a server system, comprising:
   an automated recorded action performer configured to initiate a recorded action; a request monitor, comprising:
   a monitoring interface configured to monitor one or more request object requests to the server system and one or more request object responses from the server system; and
   a request complete detector, configured to detect when the one or more request object requests to the server system are completed based at least in part upon at least some of the one or more request object responses; and
   a wait-for-ready signaler configured to signal the automated recorded action performer when a next recorded action may be performed.

17. The system of claim 16, the monitoring interface comprising: an object adapter pattern generator configured to generate a custom object adapter pattern for a request object; and
   a pending request counter configured to account for requests to the server system and corresponding request complete responses from the server system.

18. The system of claim 17, the request complete detector comprising:
   a request counter monitor configured to determine when the pending request counter reaches zero.

19. The system of claim 17, the pending request counter configured to increment by one upon initiation of a request to the server system and decrement by one upon a request completed response from the server system.

20. A non-transitory computer storage media comprising computer-executable instructions for performing at least two recorded actions on a server system,
- which when executed via a microprocessor perform actions comprising: initiating a recorded action;
- monitoring a status of one or more requests from the recorded action, comprising: applying an adapter pattern to one or more request objects, the request objects comprising application programming interface request objects;
- tracking state changes of the one or more request objects, comprising using references to an event handler specified by an application programming interface property; incrementing a monitoring counter by one for respective one or more request objects;
- determining when the one or more request objects are at a desired state, the desired state being one that corresponds to a request object being completed; and
- decrementing the monitoring counter by one when respective one or more request objects are determined to be at the desired state; and
- upon detecting that the monitoring counter has reached zero, performing a next recorded action.

* * * * *

UNITED STATES PATENT AND TRADEMARK OFFICE
CERTIFICATE OF CORRECTION

PATENT NO. : 8,489,714 B2
APPLICATION NO. : 13/022054
DATED : July 16, 2013
INVENTOR(S) : Shiva Shankar Thangadurai et al.

It is certified that error appears in the above-identified patent and that said Letters Patent is hereby corrected as shown below:

In the Claims:

Claim 20, Column 11, Line 5: Delete the word "non-transitory" after the word "A".

Claim 20, Column 11, Line 5: Delete the word "media" after the word "storage" and insert the word --device-- in its place.

Signed and Sealed this
Twenty-second Day of October, 2013

Teresa Stanek Rea
*Deputy Director of the United States Patent and Trademark Office*